Figure 1:
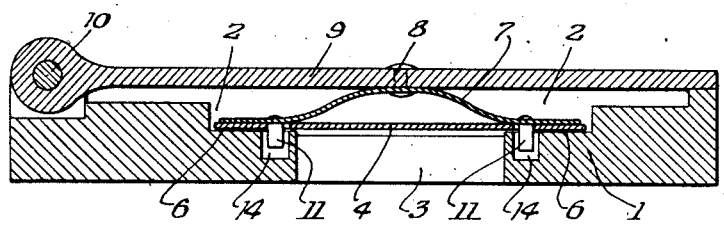

March 5, 1940.　　　H. NERWIN　　　2,192,692
CAMERA
Filed Sept. 10, 1938　　4 Sheets-Sheet 1

Inventor
Hubert Nerwin
By B. Singer & F. Stern
Attys.

March 5, 1940.                H. NERWIN                    2,192,692
                               CAMERA
                         Filed Sept. 10, 1938          4 Sheets-Sheet 2
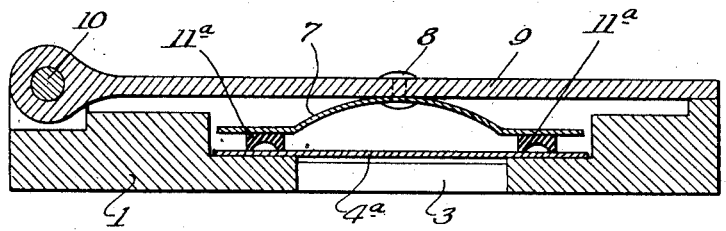
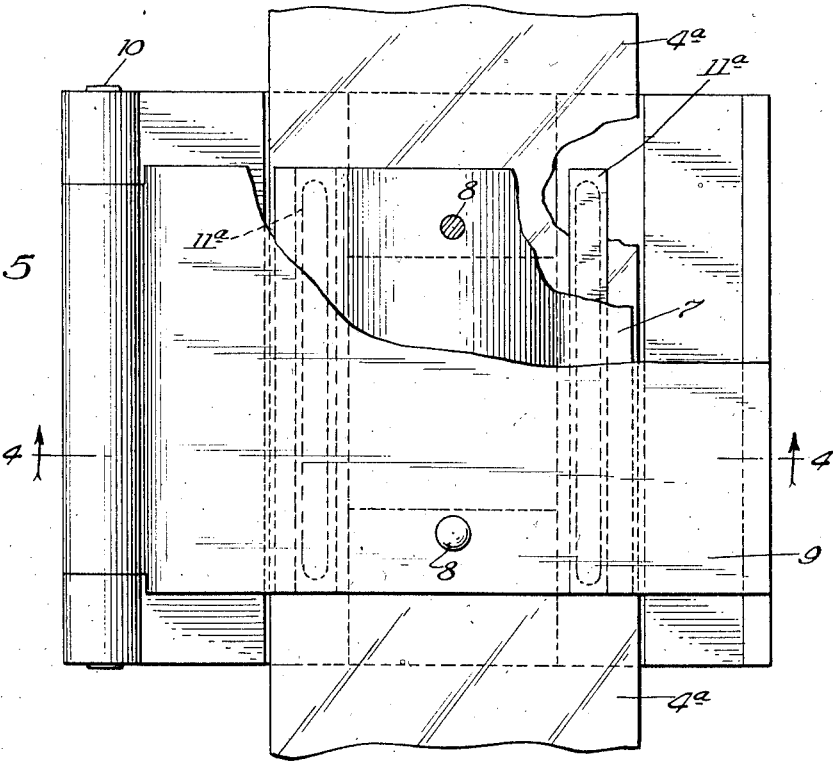
Inventor
Hubert Nerwin
BY: B. Singer & F. Stern
Attys.

March 5, 1940.   H. NERWIN   2,192,692
CAMERA
Filed Sept. 10, 1938    4 Sheets-Sheet 3

Inventor
Hubert Nerwin

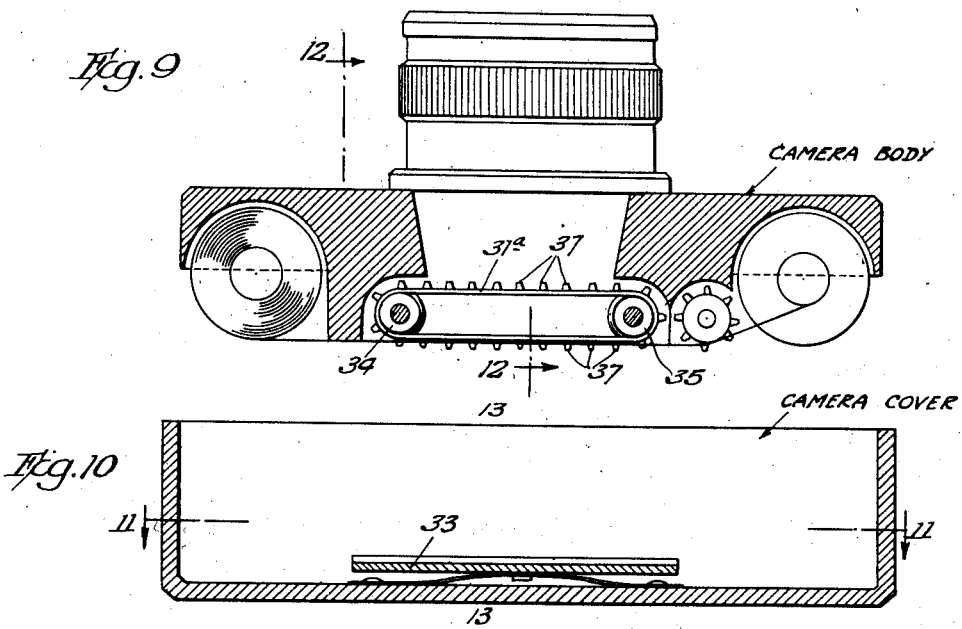
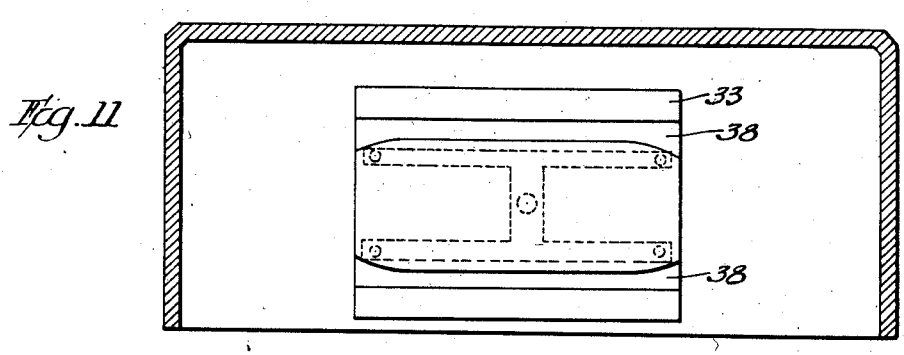
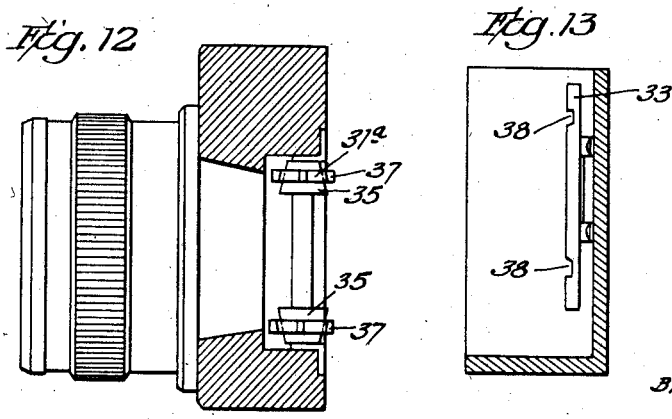
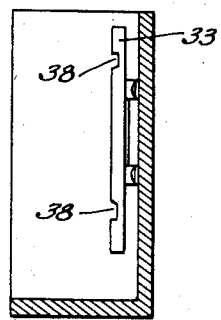

Patented Mar. 5, 1940

2,192,692

UNITED STATES PATENT OFFICE 2,192,692

CAMERA

Hubert Nerwin, Dresden-Reick, Germany, assignor to Zeiss Ikon Aktiengesellschaft, Dresden, Germany Application September 10, 1938, Serial No. 229,308
In Germany September 13, 1937

8 Claims. (Cl. 95—31)

The invention relates to improvements in cameras and in particular is directed to means for flattening out that portion of the film which is to be exposed, as in a photographic camera, or which is to be illuminated as in an enlarging device, projecting device or the like.

At the present time it is customary in photographic cameras to press the film by means of a yieldably supported pressure plate against the picture window. Such pressure devices, however, have the disadvantage that during the movement of the film strip along the film guide the film may be scratched or otherwise damaged by dust or lacquer particles or other irregularities on the surface of the pressure plate or the film window. Aside from this, the film is not completely flattened out, because that portion of the film occupying the window opening is only supported by the pressure plate, but otherwise is free and for instance may buckle into the picture window. To overcome this disadvantage, it has been proposed heretofore to place the film between two glass plates, but the latter do not prevent a scratching of the film when the same is advanced to bring the next picture frame on the film in position for exposure. Furthermore, the employment of glass plates has the disadvantage that when the same are not ground perfectly plane and are placed accurately one on top of the other, that the so called Newton rings will appear which distort or otherwise mar the picture to be produced.

It is the principal object of the present invention to overcome the disadvantages of the heretofore employed devices for flattening out the film in photographic cameras, enlargers, projectors and the like, by eliminating any pressure plate and providing in place therefor means which engage only the marginal portions of the film and tensioning the latter transversely. The tensioning of the film in longitudinal direction is effected, in case of photographic cameras, by the customary film supply spool and film take-up spool or other means, as for instance the film advancing sprocket when perforated motion picture film is used, as it is the case in most miniature cameras.

Another object of the invention is to provide rake means for the flattening or tensioning of perforated film strips. The rake means engage the marginal perforations of the film and are effective to tension the film transversely, thereby flattening it.

It is also an object of the invention to employ a stationary rake means and a movably mounted rake means for engaging the oppositely arranged perforations in the margins of the film. Preferably the movably mounted rake means is automatically moved laterally to tension the film transversely at the same time the cover of the camera is being closed.

It is another object of the invention to mount both rake means movably by attaching the same to a curved spring plate which is pressed together when the cover of the camera is closed, thereby tensioning in the film transversely.

Another object of the invention will be apparent from the description forming a part of this specification, but the invention is not limited to the embodiments herein described and illustrated in the accompanying drawings, as various other forms may be adapted within the scope of the claims.

Figure 2:
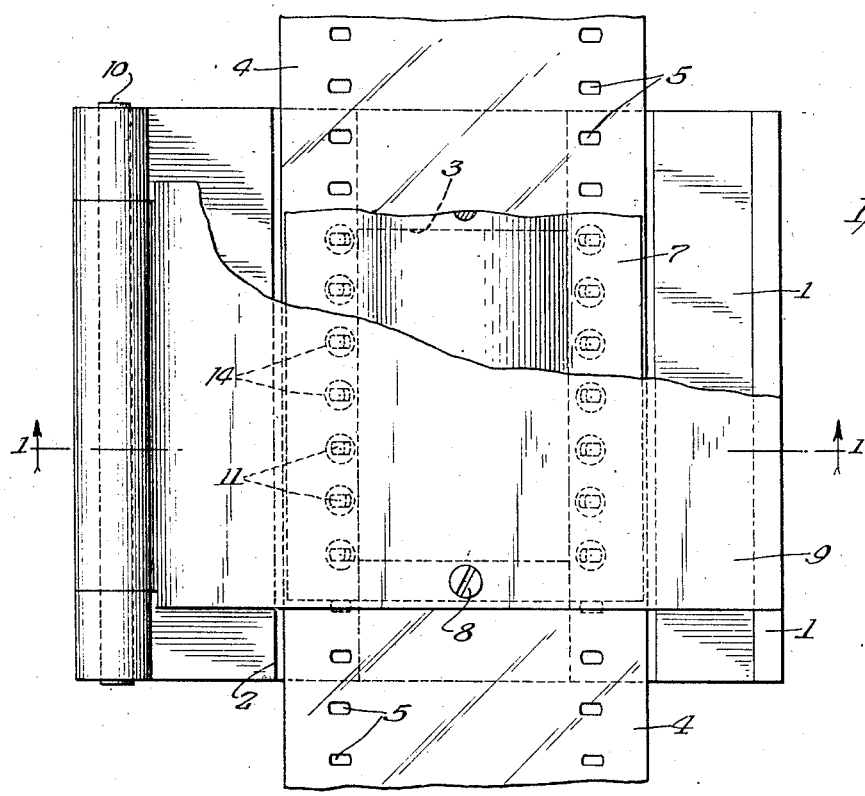
Figure 3:
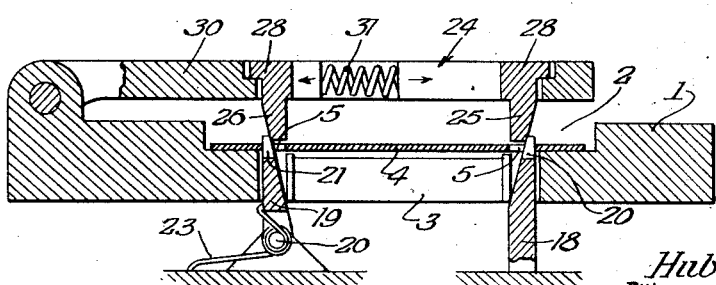

Referring to the drawings:

Fig. 1 is a cross-sectional view of the film flattening device, substantially along the line I—I of Fig. 2, Fig. 2 is a top view of the device with parts broken away, and Fig. 3 is a cross-sectional view similar to Fig. 1 but illustrating a modified embodiment of the invention.

Referring to Figs. 1 and 2, the wall 1 is provided with a film guiding groove 2 and a picture window opening 3. The film strip 4, which in the present instance is provided with marginal perforations 5 is urged against the bottom 6 of the groove 2 by the marginal portions of a curved leaf spring 7. The center portion of the spring 7 is attached at 8 to the inner face of a plate 9 hingedly mounted at 10. The plate 9 may serve as a door or a cover of a camera. The spring 7 may also be attached to the inner face of the rear wall of a camera casing and need not be attached to any hingedly mounted member.

The two opposite marginal portions of the leaf spring 7 are each provided with a series of teeth 11 forming a rake or comb which engages the marginal perforations 5 of the film when the spring 7 is compressed while being moved toward the film guiding groove 2. During this compression of the spring 7, the rakes are moved outwardly and engage the outer edges of the film perforations, thereby tensioning the film 4 transversely of its length. The bottom face 6 of the film guiding groove 2 is provided with sockets 14 of sufficient size to receive with clearance the teeth 11 when the same enter and pass through the perforations 5 of the film 4.

Fig. 3 illustrates a modified embodiment of the invention, which is adapted to be used in devices in which the film, as for instance a negative, is illuminated by light which passes through the film, as it is for instance the case in copying and enlarging devices. This embodiment employs a stationary rake 18 and a movably mounted rake 19, each being provided with wedge-shaped teeth 20 and 21 respectively. The rake 19 is pivotally supported at 22 and is under the action of a spring 23.

A pressure device 24 provided with wedge-shaped projections 25 and 26 is provided for urging the rake 19 outwardly against the action of the spring 23 so as to tension the film 4 transversely. The projections 25 and 26 are attached on a two-part frame 28 mounted on a hinged cover 30. The two parts of the frame 28 are moved apart by a spring 31. When the cover 30 is swung into the position indicated in Fig. 3 the projection 25 will engage the teeth 20 of the rake 18 and the projection 26 will engage the teeth 21 of the pivotally supported rake 19, thereby moving the latter outwardly and stretching the film 4 whose perforations 5 engage the teeth 20 and 21 transversely.

In Fig. 3 the film guiding groove is designated as in Fig. 1 with 2, the picture window with 3, and the plate or wall on which the device of the invention is mounted with 1.

While the present invention has been described by way of example in connection with a perforated film, it is believed obvious that it may be employed also for films without perforations. In such a case, it is merely necessary to substitute the means engaging the film perforations by suitable means which engage the marginal portions of the film and are adapted to tension the film transversely of its length.

It is also an object of the invention to use the device in connection with a photographic enlarging apparatus. For moving the film step by step past the projection aperture of an apparatus of the type referred to it is necessary to disconnect the tensioning means mounted upon the plate 9 from the perforation of the film. This is accomplished by moving apart the cover 30 with respect to the plate 1.

In feeding film without perforations the sprocket or rake means are substituted according to the invention by rubber edges or the like which come into engagement with the marginal portions of the film. These rubber edges are preferably provided with arcuate or hollow portions which in coming in contact with the marginal portions of the film engage the latter by suction thus enabling the spring 7 to tension the film transversely of its length. Fig. 4 shows diagrammatically the device specified. In this case it is also necessary to move apart the plate 9 before feeding a new portion of the film 4ª past the projection aperture.

If this device is intended to be used in connection with photographic cameras, it is necessary to combine these tensioning means with the camera in such a manner that opening and closing of the camera housing during the feeding movement of the film past the exposure opening becomes unnecessary.

For accomplishing this the tensioning means are constructed as shown in the annexed drawings.

Figure 6:
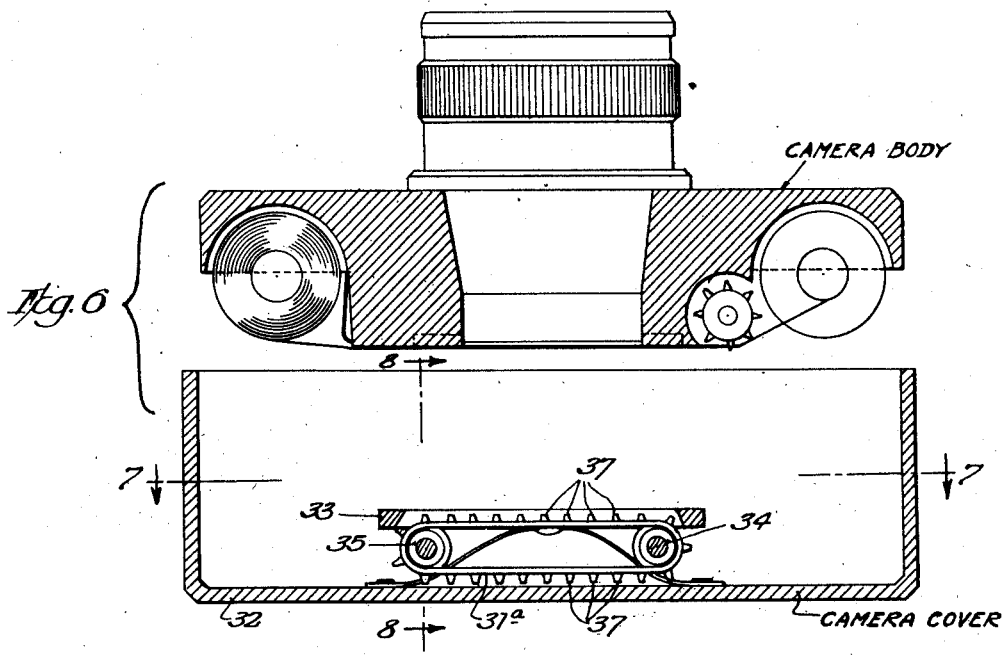

A photographic camera of the well known type employing perforated cinematographic film is shown in connection with the film feeding mechanism diagrammatically and partly in section in Fig. 6.

Figures 6, 7, 8, 9 and 12 are several embodiments of the film tensioning means according to the invention, while the Figures 10, 11 and 13 represent the film pressure plate on the camera backwall.

The film tensioning means consist hereby of two ribbonlike elements 31ª provided with teeth 37 which are adapted to engage the perforations of the film. The two ribbons are guided by two rollers 34, 35 of conical shape. During the feeding of the film these rollers are effective on account of their conical shape to move away the ribbons 31ª in a lateral direction in respect to the film movement. The teeth of the ribbons exert thus a pressure on the margins of the perforation thereby flattening and tensioning the film.

Figure 7:
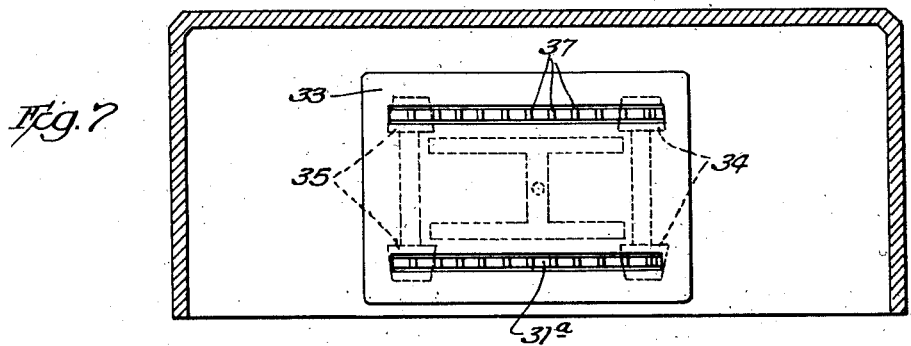
Figure 8:
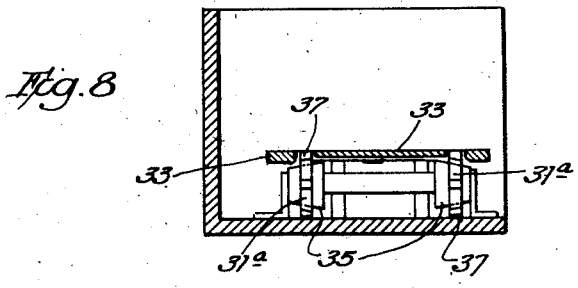

In Figures 5, 7 and 8 the ribbonlike tensioning means are mounted on the camera backwall integrally with the pressure plate 33.

The Figs. 9 and 12 show a modified embodiment of the invention. Referring to these figures the guide rollers 34, 35 and the ribbonlike tensioning means 31ª, 37 are mounted intermediate the objective and the light sensitive surface of the film. The teeth 37 engage the perforations of the film in the same manner as described above. In both embodiments the pressure plate 33 is provided with grooves or slits 38 thus enabling the teeth 37 to come into engagement with the porforations of the film.

The ribbonlike elements 31ª are preferably made from rubber or from another suitable material.

What I claim is:

1. In combination with a camera wall provided with a picture window, means adapted to engage the perforations in the two opposed marginal portions of a film which is loosely positioned on said wall and covers the picture window in the same, said means including two series of teeth, one series for the perforations in each marginal portion of the film, and means for moving at least one of said series of teeth outwardly while in engagement with said film perforations, thereby tensioning said film in a direction transversely to its length.

2. In a combination with a camera wall provided with a picture window, means adapted to engage the perforations in the two opposed marginal portions of a film which is loosely positioned on said wall and covers the picture window in the same, said means including a curved leaf spring provided on its two opposed straight edges each with a series of teeth for engaging the perforations in the marginal portions of said film, and a member pivotally attached to said camera wall and attached to said leaf spring between its two opposed straight edges, said leaf spring engaging with its straight opposed edges the marginal portions of the film and pressing the same against said wall adjacent the picture window of the same when said member is swung toward the said wall, whereby said two series of teeth engage said film perforations and upon compression of said spring tension the film transversely to its length.

3. In combination with a camera wall provided with a picture window, means adapted to engage the perforations in the two opposed marginal portions of a film which is loosely positioned on said wall and covers the picture window in the same, said means including a curved leaf spring provided on its two opposed straight edges each with a series of teeth for engaging the perforations in the marginal portions of said film, and a pivotally mounted member on which said leaf spring is attached between its two opposed straight edges, said pivotally mounted member being movable toward and away from said wall, said leaf spring engaging with its straight opposed edges the marginal portions of the film and pressing the same against said wall adjacent the picture window of the same when said pivotally mounted member is moved toward the said wall, whereby said two series of teeth engage said film perforations and upon compression of said leaf spring tension the film transversely to its length.

4. In combination with a camera wall provided with a picture window, means adapted to engage the perforations in the two opposed marginal portions of a film which is loosely positioned on said wall and covers the picture window in the same, said means including a curved leaf spring provided on its two opposed straight edges each with a series of teeth for engaging the perforations in the marginal portions of said film, and means forming the rear wall of the camera for supporting said leaf spring between its two opposed straight edges, said rear wall being removable from said camera and when being attached thereto causing said leaf spring to engage with its straight opposed edges the marginal portions of the film and pressing the same against said wall adjacent the picture window of the same, whereby said two series of teeth engage said film perforations and tension the film transversely to its length.

5. In combination with a camera having a detachable rear wall and parallel thereto a wall provided with a picture window, means adapted to engage two opposed marginal portions of a film loosely positioned on said wall and covering the picture window thereof, said means being attached to said detachable rear wall of the camera and in the attached position of said rear wall engaging said marginal film portions and tensioning the film in a direction transversely to its length.

6. In combination with a camera having a hinged door and a wall provided with a picture window, said wall being spaced from and parallel to said door when the latter is closed, means adapted to engage the perforations in the two opposed marginal portions of a film which is loosely positioned on said wall and covers the picture window in the same, said means being attached to said hinged door of the camera and in the closed position of said door engaging said film perforations being effective to tension the film in a direction transversely to its length.

7. In combination with a camera wall provided with a picture window, means engaging the perforations in the two opposed marginal portions of a film which is loosely positioned on said wall and covers the picture window in the same, said means including two series of teeth, one series for each marginal portion of the film and projecting into the perforations of the same, at least one of said series of teeth being movably mounted in a direction transversely to the longitudinal direction of the film, and means adapted to engage said series of teeth for increasing the distance between the same, whereby the film is tensioned transversely to its length.

8. In combination with a camera wall provided with a picture window, means engaging the perforations in the opposed marginal portions of a film which is loosely positioned on said wall and covers the picture window in the same, said means including two series of teeth, one series for each marginal portion of the film and projecting into the perforations of the same, at least one of said series of teeth being movably mounted in a direction transversely to the longitudinal direction of the film, and means adapted to engage said series of teeth for increasing the distance between the same, whereby the film is tensioned transversely to its length, said last named means being mounted on a pivotally mounted member provided for selectively rendering said film tensioning means operative and inoperative.

HUBERT NERWIN.